United States Patent
Antonetti

(10) Patent No.: US 11,043,751 B2
(45) Date of Patent: Jun. 22, 2021

(54) NFC ANTENNA DEVICE IN A METALLIC ENVIRONMENT

(71) Applicant: STMicroelectronics Austria GmbH, Graz (AT)

(72) Inventor: Francesco Antonetti, Graz (AT)

(73) Assignee: STMICROELECTRONICS AUSTRIA GMBH, Graz (AT)

(*) Notice: Subject to any disclaimer, the term of this patent is extended or adjusted under 35 U.S.C. 154(b) by 29 days.

(21) Appl. No.: 16/180,744

(22) Filed: Nov. 5, 2018

(65) Prior Publication Data

US 2019/0140358 A1 May 9, 2019

(30) Foreign Application Priority Data

Nov. 7, 2017 (EP) .................................... 17200336

(51) Int. Cl.
| | | |
|---|---|---|
| *H01Q 19/00* | (2006.01) | |
| *H01Q 13/10* | (2006.01) | |
| *H04W 4/80* | (2018.01) | |
| *H01Q 7/00* | (2006.01) | |
| *H01Q 1/38* | (2006.01) | |
| *H04B 5/00* | (2006.01) | |

(52) U.S. Cl.
CPC .............. *H01Q 19/00* (2013.01); *H01Q 1/38* (2013.01); *H01Q 7/00* (2013.01); *H01Q 13/10* (2013.01); *H04B 5/0025* (2013.01); *H04B 5/0081* (2013.01); *H04W 4/80* (2018.02)

(58) Field of Classification Search
CPC .......... H01Q 19/00; H01Q 7/00; H01Q 13/10; H04B 5/0081

USPC ........................................................... 343/866
See application file for complete search history.

(56) References Cited

U.S. PATENT DOCUMENTS

| | | | | |
|---|---|---|---|---|
| 8,581,542 B2* | 11/2013 | Cook | ..................... | H01Q 1/248 320/108 |
| 9,800,294 B2* | 10/2017 | Roh | ......................... | H04B 5/02 |
| 2009/0079268 A1* | 3/2009 | Cook | ..................... | H01Q 1/248 307/104 |
| 2014/0002225 A1* | 1/2014 | Konanur | .............. | H04B 5/0081 336/200 |
| 2014/0002313 A1* | 1/2014 | Yang | ...................... | H01Q 1/243 343/702 |
| 2015/0116163 A1* | 4/2015 | Caimi | ...................... | H01Q 5/22 343/703 |
| 2015/0137742 A1* | 5/2015 | Tseng | ...................... | H02J 7/025 320/108 |

(Continued)

FOREIGN PATENT DOCUMENTS

| | | |
|---|---|---|
| CN | 102236814 A | 11/2011 |
| CN | 106033832 A | 10/2016 |

(Continued)

*Primary Examiner* — Hoang V Nguyen
(74) *Attorney, Agent, or Firm* — Slater Matsil, LLP

(57) ABSTRACT

A communication device includes a first near field communication (NFC) antenna configured to have a first resonance frequency, and a metal chassis forming part of an outer surface of the communication device. The metal chassis forms an auxiliary antenna, where the auxiliary antenna is configured to be powered by the first NFC antenna by electromagnetic induction and is also configured to have a resonance frequency substantially equal to the first resonance frequency.

23 Claims, 3 Drawing Sheets

(56) References Cited

U.S. PATENT DOCUMENTS

| | | | |
|---|---|---|---|
| 2015/0178526 A1* | 6/2015 | Roh | H01Q 1/2216 |
| | | | 235/439 |
| 2015/0214620 A1* | 7/2015 | Yosui | H01Q 7/00 |
| | | | 343/702 |
| 2016/0006293 A1 | 1/2016 | Jeong et al. | |
| 2016/0112219 A1* | 4/2016 | Lee | H04B 5/0031 |
| | | | 455/77 |
| 2016/0204499 A1* | 7/2016 | Toh | H01Q 1/24 |
| | | | 343/702 |
| 2017/0346163 A1* | 11/2017 | Lee | H01Q 1/2283 |

FOREIGN PATENT DOCUMENTS

| | | |
|---|---|---|
| CN | 106207441 A | 12/2016 |
| WO | 2014128339 A1 | 8/2014 |
| WO | 2016191137 A1 | 12/2016 |

\* cited by examiner

NFC ANTENNA DEVICE IN A METALLIC ENVIRONMENT

CROSS-REFERENCE TO RELATED APPLICATIONS

This application claims priority to European Patent Application No. 17200336.0, filed on Nov. 7, 2017, which application is hereby incorporated herein by reference.

TECHNICAL FIELD

The present invention relates generally to wireless communication, and, in particular embodiments, to NFC antenna device in a metallic environment.

BACKGROUND

Near Field Communication or NFC is a short range high frequency wireless communication technology which enables such exchange of data between two contactless devices over a short distance, for example 10 centimeters.

NFC is an open platform technology standardized in ISO/IEC 18092 and ISO/IEC 21481 but incorporates a variety of pre-existing standards including ISO/IEC 14443 protocol type A and type B.

NFC devices have the capability to support, in particular, a reader/writer mode which can be used to read and write NFC transponders or tags.

A transponder may be a passive one, i.e. performing load modulation of the magnetic field generated by the reader.

A transponder may be an active one. When a transponder is an active one, i.e. using active load modulation (ALM) for transmitting information to the reader, the transponder generates the magnetic field which simulates load modulation of the reading device field performed by a passive transponder.

ALM needs to be used in case signal generated by passive load modulation is not strong enough to be detected by a reader. This is the case when transponder's antenna is small or located in a challenging environment.

NFC transmission is based on the physics phenomenon of electromagnetic inductive coupling. The reader and the tag are equipped with antenna coils and whenever electrons flow through the wires, they generate magnetic field and induce current in the coil.

If the NFC antenna and its magnetic field are closed to a conductive material like a metal piece, a circular flow of electrons known as an eddy current will begin to move through the metal like swirling water in a stream.

When a metal chassis is located between the NFC reader and receiver antenna system, the eddy current flowing on the metal surface of said chassis will turn and generate its own magnetic field, which will interact with the coil and the communication will be negatively affected.

US 2014/002313 A1 discloses a solution for integrating a NFC coil antenna in a portable device. For example, the NFC antenna is integrated under a metal chassis of the portable device. The metal chassis and a conductive coating, which is integrated underneath the full metal chassis, are designed to include one or more slots to provide high impedance to eddy currents induced in the conductive coating. This high impedance may reduce the eddy currents and as such, the NFC field strength for the coil antenna is increased.

SUMMARY

In accordance with an embodiment of the present invention, a communication device comprises a first near field communication (NFC) antenna configured to have a first resonance frequency, and a metal chassis forming part of an outer surface of the communication device. The metal chassis forms an auxiliary antenna, where the auxiliary antenna is configured to be powered by the first NFC antenna by electromagnetic induction and is also configured to have a resonance frequency substantially equal to the first resonance frequency.

In accordance with an alternative embodiment of the present invention, a communication device includes a first near field communication (NFC) antenna configured to generate an electromagnetic field with a NFC carrier frequency. The device further includes an auxiliary antenna comprising an electrically conductive structure having a slot. The auxiliary antenna is electromagnetically inductively coupled with the first NFC antenna and is configured to have a resonance frequency substantially equal to the NFC carrier frequency and to be operative in response to eddy currents generated in the conductive structure by the electromagnetic field generated by the first NFC antenna.

In accordance with an alternative embodiment of the present invention, a method of operating a communication device is provided. The method comprises having a first near field communication (NFC) antenna that has a resonance frequency equal to a carrier frequency, and having an auxiliary antenna that comprises an electrically conductive structure that includes a slot. The auxiliary antenna has a resonance frequency substantially equal to the carrier frequency. The method further includes electromagnetically inductively coupling the auxiliary antenna with the first NFC antenna, exciting the first NFC antenna with a current having the carrier frequency in order to generate an electromagnetic field, and driving the auxiliary antenna with eddy currents induced into the electrically conductive structure by the electromagnetic field.

BRIEF DESCRIPTION OF THE DRAWINGS

Other advantages and features of the invention will appear in the detailed description below and in the appended drawings which are not limitative, in which.

DETAILED DESCRIPTION OF ILLUSTRATIVE EMBODIMENTS

Embodiments of the invention relate to wireless communication between elements, for example between a reader and a transponder, in particular between a Near Field Communication (NFC) contactless tag reader, for example located within a wireless apparatus, such as a mobile phone, and a tag, using typically a high frequency communication operating at 13.56 MHz.

Embodiments of the invention relate more particularly to the NFC antennas located within such elements provided with metallic structures, such as metal chassis, often used to maintain mechanical strength of said elements especially when those elements have a thin design.

Embodiments of the invention can be used either with passive or active transponders.

Figure 1:
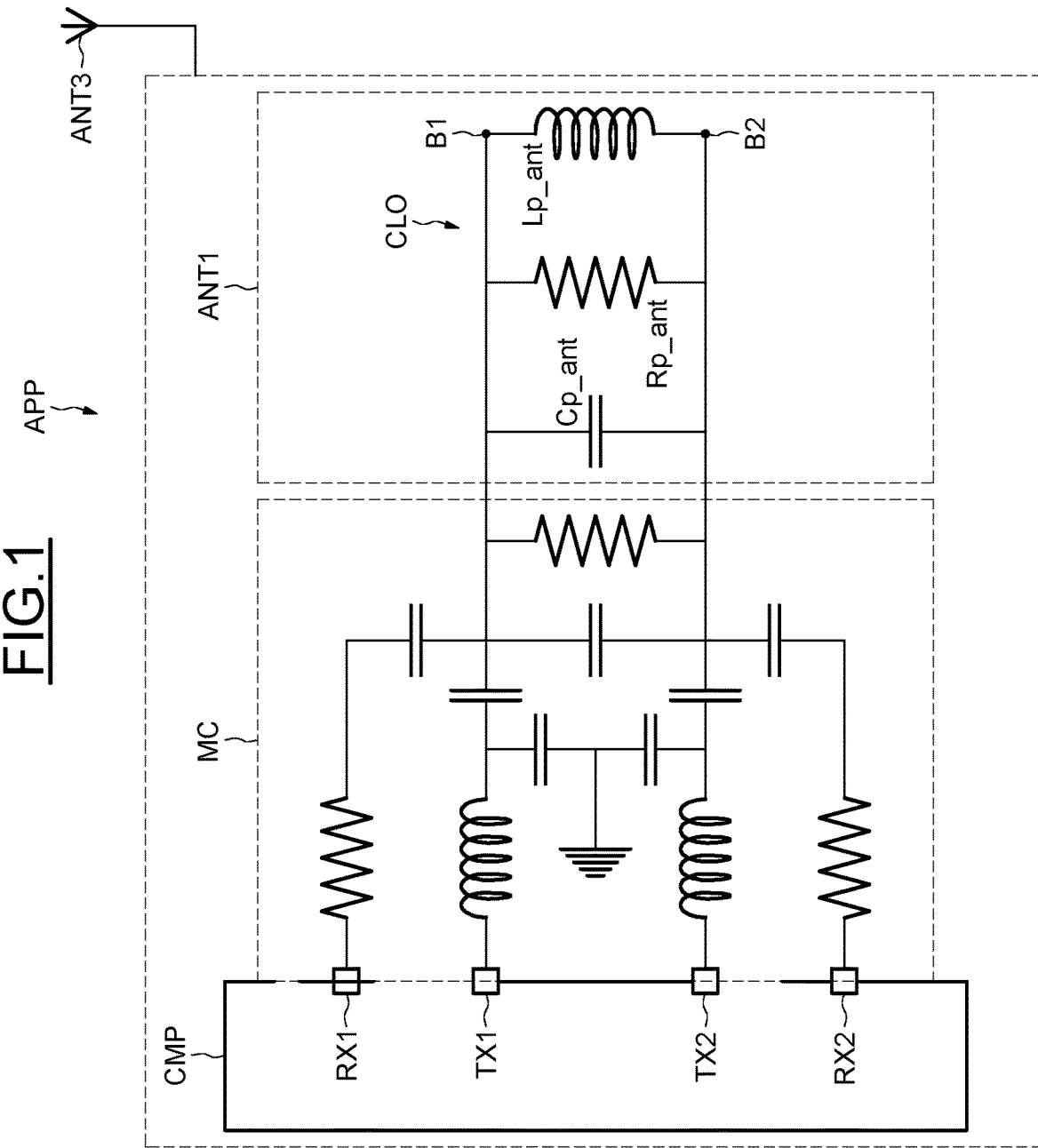
FIG. 1 illustrates a schematic circuit of a communication apparatus in accordance with embodiments of the present invention.

On FIG. 1, reference APP designates a communication apparatus, for example a smartphone or a tablet provided with an antenna ANT3 for allowing telephone communication.

Alternatively the apparatus may be a portable computer.

In the present case, the apparatus APP comprises also a NFC system including a wireless component CMP of the NFC type, for example, a NFC microcontroller.

In the present example, the microcontroller CMP includes terminals TX1, TX2 usable in a reader mode and two other terminals RX1, RX2 usable in the reader mode and in a card mode.

Eventually, the CMP component may comprise an internal switch for shorting terminals TX1 and TX2 for an operation in card mode or not shorting terminals TX1 and TX2 for allowing an operation in reader mode.

In the present example, we assume now that the apparatus APP operates as a NFC reader.

The reader APP is provided with a first NFC antenna ANT1 including a coil CLO having an inductance value equal to Lp_ant, a resistive value equal to Rp_ant and a capacitance value equal to Cp_ant.

The coil CLO has two terminals B1 and B2 respectively connected to terminals RX1, TX1 and to terminals RX2, TX2 through a conventional matching circuit MC including an electromagnetic interference (EMI) filter.

The resistive, capacitive and inductive values of the different components of the first antenna ANT1 and the matching circuit MC are chosen so that the first antenna ANT1 forms a first resonance circuit having a resonance frequency equal to a NFC carrier frequency, typically 13.56 MHz.

Thus, when the antenna ANT1 is excited by a current having a frequency equal to said NFC carrier frequency, it induces an electromagnetic field at the resonant antenna ANT1.

Figure 2:
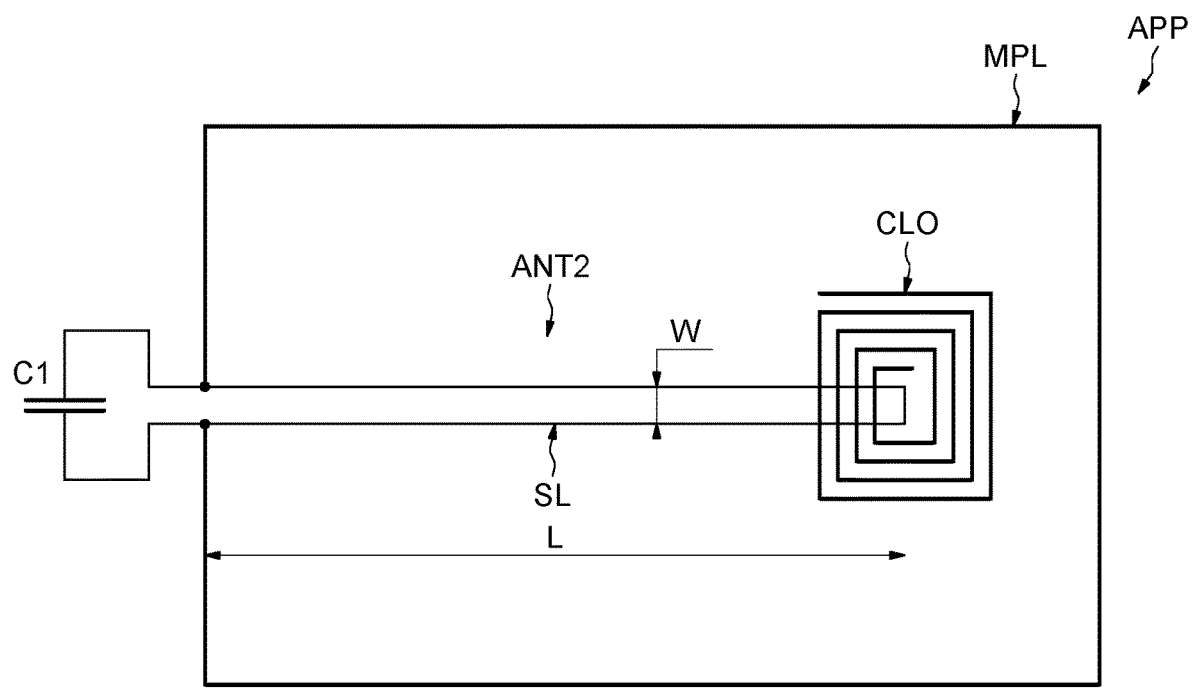
FIG. 2, which is a partial view from below, of a communication apparatus in accordance with embodiments of the present invention.

Turning now to FIG. 2, which is a partial view from below, it can be seen that the reader APP comprises a metal chassis, for example belonging to a wall of the apparatus, which can be used for maintaining mechanical strength of the apparatus, especially when the apparatus is configured according to a thin design.

For devices having a complete metallic chassis, the metal is a barrier for the magnetic field generated by the NFC antenna ANT1 since the NFC antenna needs a non-metallic surface in order to radiate through.

However, in the present case, as it will be now explained more in details, the metal chassis MPL, including for example a metallic plate or a carrier covered by a an electrically conductive material, will be used as an auxiliary antenna ANT2 in close resonance to the first NFC reader antenna ANT1 increasing thus the effective area of the global antenna device including both antennas ANT1, ANT2.

More precisely, a slot-like structure in the metal chassis, eventually combined with a capacitor, can be used as a secondary resonating system allowed to use the eddy current, induced on the metal plate by the electromagnetic field generated by the NFC antenna ANT1, to increase the performance of the NFC reader.

As illustrated on FIG. 2, the metal plate MPL is provided with a slot SL having a length L and a width W. The coil CLO of the first antenna ANT1 is here in close proximity of one end of the slot SL.

Figure 3:
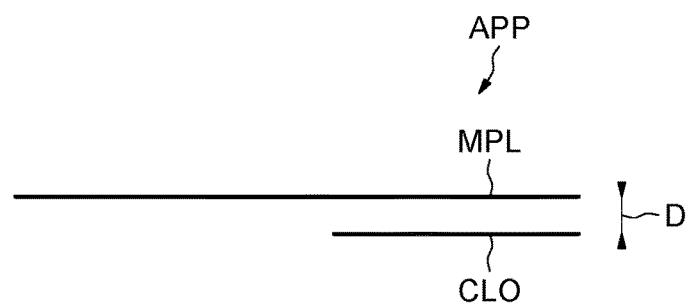
FIG. 3 schematically illustrates the coil in relation to the outer wall of the communication apparatus in accordance with embodiments of the present invention.

For example, the coil CLO may be directly embedded on the metal plate MPL or as illustrated in FIG. 3, located in close proximity underneath the metal plate, for example at a distance smaller than 1 mm.

In this example, the location of the coil CLO underneath (either in an embedded manner or in a close proximity manner) the metal chassis, which belongs to or forms a wall of the apparatus, corresponds to a location of said coil inside of the apparatus.

Although it is not compulsory, the slot SL is provided here at its other end with a capacitor C1 connected in parallel with the slot SL.

Figure 4:
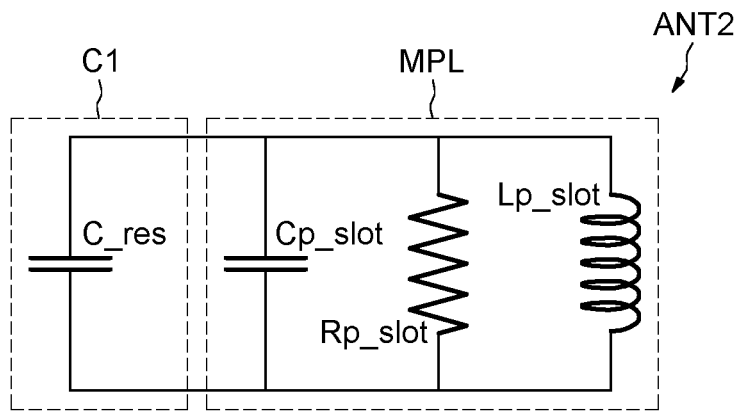
FIG. 4 illustrates a schematic equivalent electrical circuit of a resonating slot structure forming an auxiliary antenna in accordance with embodiments of the present invention.

The equivalent electrical circuit of the resonating slot structure forming the auxiliary antenna ANT2 is depicted on FIG. 4 in which Lp_slot designates the inductance value of the slot SL (and thus of the antenna ANT2), Rp_slot designates the resistive value of the slot SL (and thus of the antenna ANT2), Cp_slot designates the capacitance value of the slot SL and C_res designates the capacitance value of the capacitor C1.

Without the resonating slot, the metal plate would act as a short for the NFC antenna ANT1 and the electromagnetic field generated by this antenna ANT1 would create only eddy currents.

However, the metal plate together with the slot is in the radiofrequency domain a RLC resonance circuit which resonates to a certain frequency fr according to the formula:

$$fr = \frac{1}{2\pi\sqrt{Cp\_slot * Lp\_slot}} \quad (I)$$

Lp_slot is directly proportional to the physical dimension of the slot and Cp_slot is inversely proportional to the width of the slot.

Typically, the resonance frequency fr of the slot system is very high and in order to get a resonance frequency close to the NFC one (13.56 MHz), it is preferable to use the capacitor C1 and the formula giving the resonance frequency fr of the antenna ANT2 becomes thus:

$$fr = \frac{1}{2\pi\sqrt{(C\_slot + C\_res) * L\_slot}} \quad (II)$$

Length and width of the slot can be defined based on the size on the metal plate and on the desired application specification. The capacitance value C_res will be thus consequently dimensioned.

A possible solution for determining the length and the width of the slot as well as the capacitance value C_res, is based on inductance values and capacitance values measurements on a slot having a given width and different lengths.

Such measurements may be performed by a conventional vector network analyzer, for example, the vector network analyzer E5061B 5 Hz-3 GHz of Keysight Technologies.

More precisely an electrically conductive structure is provided, comprising for example a rectangular carrier having a thickness of 0.5 mm and made of so called FR-4 material which is a composite material composed of woven fiberglass cloth with an epoxy resin binder, said carrier being covered with a conductive material, such as copper, having a thickness of 0.035 mm.

The length of the rectangular electrically conductive structure is equal to 168 mm and the width is equal to 64 mm.

A slot having a chosen length L and a fixed width of 1 mm is realized in the electrically conductive structure and is similar to the one illustrated in FIG. 2.

The length L may be chosen in the range 10 mm-120 mm.

For a given length L, the analyzer is connected to the opened end of the slot, and measures the inductance value of the slot at 13.56 MHz.

The capacitance value of the slot is also measured.

Then the capacitance value C_res of capacitor C1 is calculated according to formula (II) above.

Finally the corresponding capacitor C1 having this calculated capacitance value is physically connected to the opened end of the slot, and the actual resonance frequency fr is checked by measurement.

This process is repeated for several values of the length L in the above mentioned range until having a resonance frequency fr very close to 13.56 MHz (the deviation between 13.56 MHz and said very close actual checked resonance frequency fr being due to components tolerances).

For example, for the values of electrically conductive structure mentioned above, a slot having a length L of 100 mm, a width of 1 mm and connected to a capacitor C1 of 3.393 nF leads to a resonance frequency of 13.66 MHz.

Of course this example is non limitative.

The NFC antenna ANT1 can be thus considered as a driver and the metal chassis MPL with its own resonance frequency becomes part of the emission/reception chain of the apparatus and the electromagnetic field generated by the antenna ANT1 is not tamped from the metal but goes through.

An additional advantage is related to the size of the coil antenna ANT1. In fact, the metal chassis close to the driver antenna ANT1 has a beneficial effect to increase the effective reading area.

The size of the antenna coil ANT1 can be reduced becoming more cost effective while maintaining acceptable performance.

In a battery supplied apparatus, the current consumption of every single component represents a crucial aspect in the power budget. In most of the cases to maintain acceptable NFC performances in a metallic environment, it is necessary to drive more current in the system to overcome the losses due to the low impedance unfriendly surrounding and those resistive losses cause an overheating of the apparatus.

The different aspects of the invention allow more flexibility in design and help to optimize the current consumption without affecting the performance.

Figure 5:
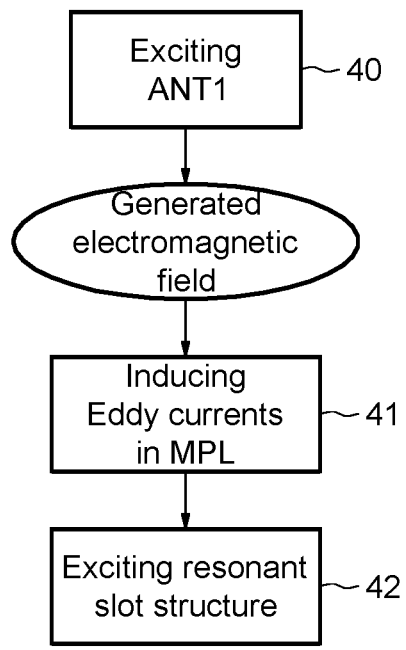
FIG. 5 illustrates an embodiment of a method of operating the communication apparatus in accordance with embodiments of the present invention.

Turning now to FIG. 5, an embodiment of a method of operating an antenna device according to the invention is now disclosed.

In a first step 40, the first NFC antenna ANT1 is excited with a current having the NFC carrier frequency and this excitation produces a generated electromagnetic field which induces eddy currents in the metal chassis MPL (step 41).

Those eddy currents excite the resonance slot structure (step 42) which resonates at the NFC carrier frequency.

Accordingly, in various embodiments, a totally different solution is proposed for improving the performance of a NFC reader in close proximity to a metal chassis.

According to an aspect, a NFC antenna device is proposed, comprising a first NFC antenna, configured to generate an electromagnetic field with a NFC carrier frequency and an auxiliary antenna comprising an electrically conductive structure having at least a slot.

Said auxiliary antenna is in an electromagnetic inductive coupling with said first NFC antenna and is configured to have a resonance frequency equal to said NFC carrier frequency.

Further, said auxiliary antenna is configured to be operative in response to eddy currents, induced in said conductive structure by said electromagnetic field generated by said first NFC antenna.

Thus, according to this aspect, the NFC antenna device comprises two antennas, i.e. the first NFC antenna and the auxiliary antenna. The electrically conductive structure of the auxiliary antenna, for example a metal plate of a metallic chassis, is used as a secondary antenna in close resonance to the first NFC antenna. And, this auxiliary antenna, which is an auxiliary resonating system, uses the eddy current, induced on the metal, to increment the performance of the whole NFC antenna device.

In other words, the first NFC antenna, which is excited by a current having a NFC carrier frequency (for example 13.56 MHz), generates an electromagnetic field inducing eddy currents in the electrically conductive structure of the auxiliary antenna, which is accordingly driven by the first NFC antenna.

Thus, instead of trying to minimize the eddy currents as in the prior art, this aspect uses the eddy currents to excite the auxiliary antenna which, in combination with the first NFC antenna, forms a global NFC antenna device having increased performances.

For example, in a standard NFC application, the typical size of a coil antenna (the first NFC antenna) to provide an acceptable user performance is about 30 mm×50 mm. And, as the electrically conductive structure of the auxiliary antenna becomes an active part of the transmission/reception chain of the reader, the size of the first NFC antenna coil can be reduced for example about 10 times (4 mm×4 mm) compared to a standard size.

Generally speaking, the auxiliary antenna is considered as being in an electromagnetic inductive coupling with said first NFC antenna when both antennas are in close proximity. The man skilled in the art can adjust the distance between said first NFC antenna and said auxiliary antenna in order to obtain this electromagnetic inductive coupling in an efficient manner, depending on the application.

However, as an example, the distance between said first NFC antenna and said auxiliary antenna is smaller than 1 mm.

According to an embodiment, the electrically conductive structure of the auxiliary antenna may be a metallic chassis, for example the one used to increase the mechanical strength of the reader, and more particularly a metal plate of said metallic chassis.

Although it would be possible to shape the slot in the way that it is self-resonating at or around the carrier frequency, for example 13.56 MHz, it is preferable that the auxiliary antenna further comprises at least one capacitor coupled in parallel with said slot. Such capacitor on the slot is thus advantageously used for tuning easier the metal plate resonance frequency at around 13.56 MHz.

The first NFC antenna may be located underneath the metal chassis, i.e. inside of the reader if the metal chassis is for example a wall of the reader.

The first NFC antenna may for example comprise a coil embedded in the metal chassis or can be also made out of a printed circuit board (PCB) or a flexible printed circuit (FPC) directly embedded to the metal chassis.

According to another aspect, a NFC reader, for example a smartphone or a tablet or a portable computer, is proposed comprising a metal chassis and a NFC antenna device as defined above, said metal chassis including said auxiliary antenna.

According to another aspect, a method of operating a NFC antenna device is proposed. The method comprises providing a first NFC antenna having a resonance frequency equal to a NFC carrier frequency; providing an auxiliary antenna comprising an electrically conductive structure having at least a slot, where the auxiliary antenna is in an electromagnetic inductive coupling with said first NFC antenna and has a resonance frequency equal to said NFC carrier frequency. The method also includes exciting said first NFC antenna with a current having said NFC carrier frequency in order to generate an electromagnetic field; and driving said auxiliary antenna with eddy currents induced into said electrically conductive structure by said electromagnetic field.

What is claimed is:

1. A communication device comprising:
    a microcontroller having a first transmit terminal, a second transmit terminal, a first receive terminal, a second receive terminal, and a switch, the switch configured to disable the first transmit terminal and the second transmit terminal in a card mode and enable the first transmit terminal and the second transmit terminal in a reader mode of the communication device;
    a first near field communication (NFC) antenna comprising a capacitor and an inductor, the capacitor and the inductor configured to provide a first resonance frequency that is substantially the frequency for NFC communication, the first NFC antenna having a first antenna terminal and a second antenna terminal, the first antenna terminal coupled to the first transmit terminal and the first receive terminal of the microcontroller, the second antenna terminal coupled to the second transmit terminal and the second receive terminal;
    a matching circuit coupled to the first antenna terminal of the first NFC antenna and to the second antenna terminal of the first NFC antenna;
    an electromagnetic interface filter coupled to the matching circuit;
    a metal chassis comprising a slot and electromagnetically inductively coupled with, and at least partially overlapping, the first NFC antenna, the metal chassis forming part of an outer surface of the communication device, the metal chassis providing mechanical strength to the communication device, the first NFC antenna comprising a printed circuit board or a flexible printed circuit directly embedded in the metal chassis; and
    a capacitor coupled directly to the slot, the metal chassis and the capacitor forming an auxiliary antenna, the auxiliary antenna configured to be powered by the first NFC antenna by electromagnetic induction, the auxiliary antenna comprising the metal chassis and the capacitor being configured to have a second resonance frequency substantially equal to the first resonance frequency.

2. The communication device according to claim 1, wherein the auxiliary antenna is electromagnetically inductively coupled with the first NFC antenna and configured to be operative in response to eddy currents generated in the metal chassis by the electromagnetic field generated by the first NFC antenna.

3. The communication device according to claim 1, wherein the first NFC antenna is disposed underneath the metal chassis inside the communication device.

4. The communication device according to claim 1, wherein a distance between the first NFC antenna and the metal chassis is smaller than 1 mm.

5. The communication device according to claim 1, wherein the first NFC antenna overlaps with the slot.

6. The communication device according to claim 1, wherein the communication device is a passive transponder.

7. The communication device according to claim 1, wherein the communication device is an active transponder.

8. A method of operating a communication device, the method comprising:
    having a first near field communication (NFC) antenna having a first resonance frequency equal to a carrier frequency for NFC communication, the first NFC antenna having a length of 4 millimeters (mm);
    having an auxiliary antenna comprising an electrically conductive structure that includes a slot and a capacitor coupled directly in parallel to the slot, the auxiliary antenna having a second resonance frequency substantially equal to the carrier frequency, the slot having a length of 100 mm;
    electromagnetically inductively coupling the electrically conductive structure that includes the slot with the first NFC antenna, the electrically conductive structure that includes the slot partially overlapping the first NFC antenna;
    exciting the first NFC antenna with a current having the carrier frequency in order to generate an electromagnetic field; and
    driving the auxiliary antenna with eddy currents induced into the electrically conductive structure by the electromagnetic field.

9. The method according to claim 8, wherein the electrically conductive structure is a metallic chassis that comprises an outer surface of the communication device.

10. The method according to claim 9, wherein the first NFC antenna is located underneath the metal chassis.

11. The method according to claim 9, wherein the first NFC antenna comprises a coil embedded in the metal chassis, the capacitor having a value of 3.393 nanofarad (nF).

12. The method according to claim 8, wherein the first NFC antenna is located in front of the slot.

13. A method, comprising:
    designing a first antenna for a first communication device, the first antenna having a first resonance frequency substantially the frequency for NFC communication, the first antenna having a first length and a first width;
    determining a first performance profile of the first antenna in the first communication device based on the first length and the first width;
    designing a second antenna for a second communication device, the second antenna having a second resonance frequency substantially the frequency for NFC communication, the second antenna having a second length and a second width, wherein the designing the second antenna comprises:
        designing a metal chassis for the second communication device, the metal chassis comprising a slot and electromagnetically inductively coupled with, and at least partially overlapping, the second antenna, the metal chassis forming part of an outer surface of the second communication device, the slot having a third length and a third width, the metal chassis forming an auxiliary antenna, the auxiliary antenna powered by the second antenna by electromagnetic induction, the auxiliary antenna having a second resonance frequency substantially equal to the first resonance frequency, and determining a value for the second length of the second antenna, a value for the second width of the second antenna, a value for the third length of the slot, and a value for third width of the slot based on generating a second performance profile for the second antenna to be substantially the same as the first performance profile of the first antenna; and fabricating the second antenna.

14. The method of claim 13, wherein the designing the second antenna further comprises determining a value for a capacitor coupled directly to the slot.

15. The method of claim 13, wherein the designing the second antenna further comprises determining a distance between the second antenna and the auxiliary antenna.

16. The method of claim 13, wherein the second communication device is a NFC reader.

17. The method of claim 13, wherein the second communication device is a smartphone, a tablet, or a portable computer.

18. The method of claim 13, wherein the second antenna is a coil embedded in the metal chassis.

19. The method of claim 13, wherein the metallic chassis comprises an outer surface of the second communication device.

20. The method of claim 13, wherein the first length and the first width are, respectively, multiple times greater than the second length and the second width.

21. The method of claim 13, wherein the second antenna comprises a printed circuit board or a flexible printed circuit directly embedded to the metal chassis.

22. The method of claim 13, wherein the second antenna is directly embedded to the metal chassis.

23. The method of claim 13, wherein the second antenna comprises a coil embedded in the metal chassis.

* * * * *